G. W. JESSUP, Sr.
POTATO DIGGER.
APPLICATION FILED OCT. 14, 1909.
977,803.
Patented Dec. 6, 1910.
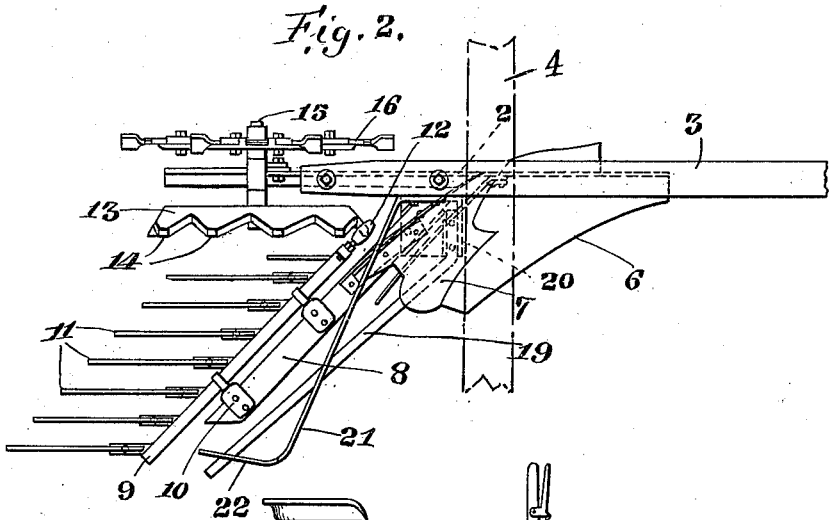
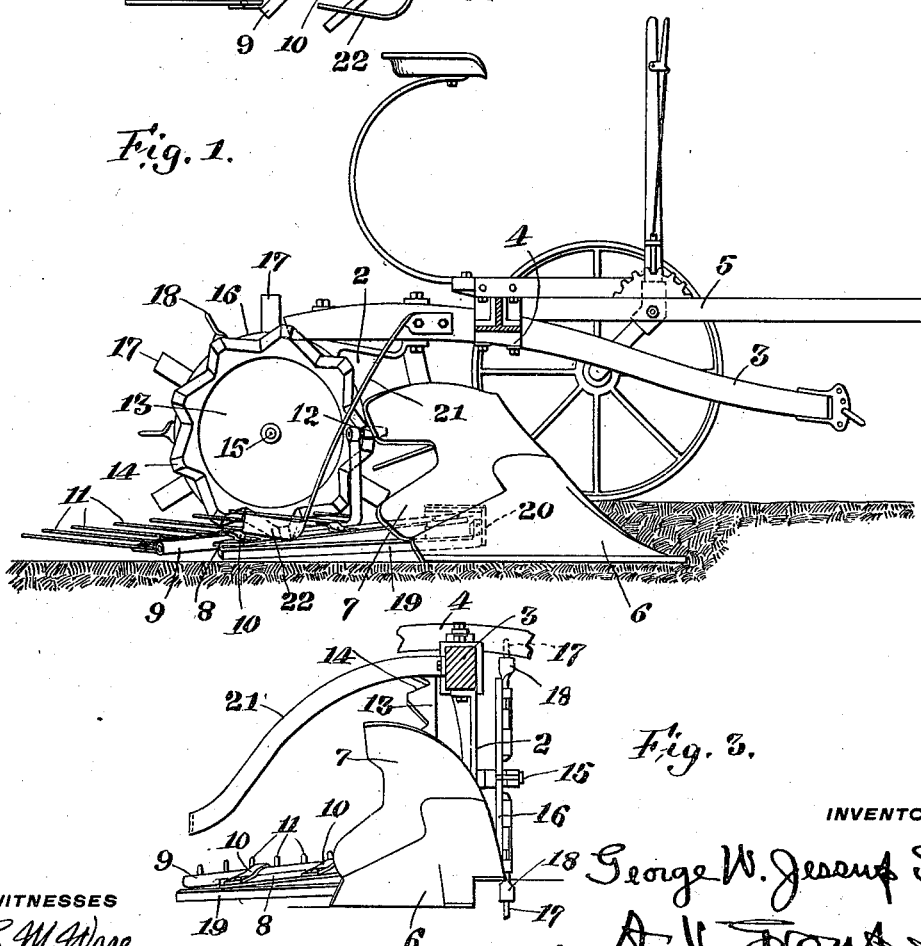
WITNESSES
INVENTOR
George W. Jessup Sr.
by A. V. Troup
ATTORNEY

UNITED STATES PATENT OFFICE.

GEORGE W. JESSUP, SR., OF MOORESTOWN, NEW JERSEY.

POTATO-DIGGER.

977,803.

Specification of Letters Patent. Patented Dec. 6, 1910.

Application filed October 14, 1909. Serial No. 522,636.

*To all whom it may concern:*

Be it known that I, GEORGE W. JESSUP, Sr., citizen of the United States, residing at Moorestown, in the county of Burlington and State of New Jersey, have invented certain new and useful Improvements in Potato-Diggers, of which the following is a specification.

The object of my invention is to provide a potato digger of novel, simple and efficient construction having provision whereby the ground containing the potatoes may be plowed and the potatoes separated from the plowed ground.

The invention also includes a novel means for preventing the potato vines above the ground from clogging in the machine, as will hereinafter be fully described and claimed.

In the drawings:—Figure 1 is a side elevation of my improved potato digger, partly shown in section. Fig. 2 is a plan view of the plow and its frame and the parts of the mechanism carried thereby. Fig. 3 is a front view of the parts shown in Fig. 2, including a part of the cross-bar of the sulky for carrying the mechanism.

The plow frame comprises the standard 2 and the beam 3 secured to the top of the standard. The beam 3 is secured to and carried by the cross-bar 4 of the plow sulky 5. The construction of the plow sulky 5 is common and well known and needs no detailed description or illustration herein.

Secured to the forward portion of the standard 2 of the plow frame are a plowshare 6 and a mold-board 7, the mold-board 7 being located above the plowshare and positioned to deliver the plowed ground laterally from the plowshare in the usual manner.

Extending laterally from the plow standard 2 is a frame 8 along the rearward edge of which extends a horizontal bar 9 which is mounted to rock in bearing blocks 10 which are secured to the frame 8.

The bar 9 is provided with projections 11, which extend rearwardly from the frame 8 in spaced relation to each other, for a purpose hereinafter explained. One end of the bar 8 extends upwardly and carries a roller 12 which engages a cam wheel 13 provided with suitable cam projections 14. The bar 9, projections 11 and roller 12 are so disposed with relation to each other and to the cam wheel 13 that the weight of the projections 11 will maintain the roller 12 in engagement with the cam wheel 13 and cause it to enter the spaces between the cam projections 14 during the rotation of the cam wheel 13.

The cam wheel 13 is secured to one end of a rotatable shaft 15 which extends through a suitable bearing on the plow standard 2. To the other end of the shaft 15 is secured a driving wheel 16. This wheel 16 is provided with suitably-spaced, radially-projecting plates 17, which are arranged parallel to the plane of the rotation of the wheel 16, and radially projecting plates 18 arranged intermediate the plates 17 and at right angles thereto, or at right angles to the plane of rotation of the wheel 16. The plates 17 and 18 are arranged to engage the ground during the forward travel of the machine for the actuation of the shaft 15, the plates 17 preventing lateral displacement of the wheel 16 from its path of travel, and the plates 18 insuring the rotation of the wheel 16. The plates 17 and 18 may be formed integral with the wheel 16, or they may be formed separately and secured thereto in any suitable manner as desired.

Arranged in front of and below the frame 8 and in spaced relation thereto is a bar 19. This bar 19 extends away from the mold-board 7, as shown, and the end of the bar 19 adjacent to the mold-board 7 is secured to a bracket 20 which projects fixedly from the standard 2 of the plow frame, the other end of the bar 19 being free and extending beyond the outer end of the frame 8 for a purpose hereinafter explained.

Secured to the beam 3 of the plow frame is one end of a vine-engaging bar 21, which extends outwardly from the plow frame or beam 3 above the mold-board 7 and then downwardly toward the frame 8. The lower free end of the bar 21 is provided with an upwardly extending, vertically-arranged fin 22 which is located away from the mold-board 7 in a plane above the frame 8 and is positioned to direct the plowed ground delivered from the mold-board 7 rearwardly to the frame 8 and the projections 11 during the forward travel of the machine.

The operation of the machine is as follows:—The plow is advanced through the ground in the usual manner, and the ground containing the potatoes is plowed thereby. During the forward movement of the plow the wheel 16 engages the ground and is rotated thereby, thus causing the shaft 15 and cam wheel 13 to rotate. During the rotation of the cam wheel 13 the engagement of the roller 12 with the cam projections 14 causes a rapid shaking, or up-and-down movement of the projections 14 carried by the bar 9; that is, as the cam projections 14 and the spaces there-between pass the roller 12, the roller is forced outwardly from the center of the wheel 13 by the projections 14, and is permitted to move toward the center of the wheel 13 by the spaces between the cam projections 14.

As each successive furrow is cut by the plow, the ground cut from the furrow and containing the potatoes is directed by the plowshare 6 and the mold-board 7 to fall upon the laterally extending frame 8 and the projections 11 extending rearwardly therefrom.

The partially broken ground as it is delivered from the plowshare 6 and the mold-board 7 to the frame 8 and projections 11 is acted upon by the bar 19 and fin 22. The bar 19 acts still further to break the plowed ground as it passes to the frame, the space between the part 19 and frame 8 being small enough to prevent any potatoes from passing therethrough, and being large enough to permit broken ground to pass therethrough.

The fin 22 acts to engage the plowed ground delivered from the plowshare and mold-board and direct it to the rearwardly extending projections 11 and prevents the passage of any plowed ground containing potatoes off of the end of the frame 8.

The frame 8 and parts carried thereby extend not only laterally from the plow frame, but also rearwardly, and it will therefore be seen that the plowed ground delivered from the plowshare and mold-board has a tendency to pass not only rearwardly from the projections, but also laterally from the free ends of the frame 8 and bars 9 and 19. It will therefore be seen that the presence of the fin 22 is important in insuring the contact of all the plowed ground containing potatoes with the projections 11. It will also be seen that the bar 19, being supported at its ends adjacent the mold-board 7 and having its other end free, will permit the plowed ground not only to pass rearwardly between the bar 19 and frame 8, but also to pass rearwardly from the free and spaced outer ends of the frame 8 and bar 19 and prevent clogging.

The vine-engaging bar 21 is so located with respect to the other parts of the machine that the projecting vines above the ground being plowed will be engaged by said bar and delivered laterally from the machine, while the plowed ground directly beneath the vines is permitted to pass under the bar 21 and be directed to the projections 11 of the separating mechanism.

The outer end of the vine-engaging bar 21 being made free and unsupported is important in that it permits no vines that may pass under the bar 21 to be discharged from the end thereof between the bar and the other parts and thereby prevents clogging of the vines.

I claim:—

1. In a potato digger, the combination of a plow frame, a plowshare, a mold-board, a frame extending laterally from the plow frame adjacent the mold-board, means extending rearwardly from said second frame for separating potatoes from plowed ground, and a bar supported in front of and below said second frame and in spaced relation thereto.

2. In a potato digger, the combination of a plow frame, a plowshare, a mold-board, a frame extending laterally from the plow frame adjacent the mold-board, means extending rearwardly from said second frame for separating potatoes from plowed ground, and a bar extending away from said mold-board in front of and below said second frame and in spaced relation thereto, said bar being supported at its end adjacent said mold-board and having its other end free.

3. In a potato digger, the combination of a plow frame, a plowshare, a mold-board, a frame extending laterally from the plow frame adjacent the mold-board, means extending rearwardly from said second frame for separating potatoes from plowed ground, and a fin supported away from said mold-board in a plane above the plane of said second frame, said fin being positioned to direct plowed ground delivered from said mold-board rearwardly to said means.

4. In a potato digger, the combination of a plow frame, a plowshare, a mold-board, a frame extending laterally from the plow frame adjacent the mold-board, means extending rearwardly from said second frame for separating potatoes from plowed ground, and a bar having one end secured to said plow frame and having its other end provided with a fin located away from said mold-board in a plane above the plane of said second frame, said fin being positioned to direct plowed ground delivered from said mold-board rearwardly to said means.

5. In a potato digger, the combination of a plow frame, a plowshare, a mold-board, a frame extending laterally from the plow frame adjacent the mold-board, means extending rearwardly from said second frame for separating potatoes from plowed ground, and a vine-engaging bar supported to extend outwardly from said plow frame above said mold-board and then downwardly toward said second frame.

6. In a potato digger, the combination of a plow frame, a plowshare, a mold-board, a frame extending laterally from the plow frame adjacent the mold-board, means extending rearwardly from said second frame for separating potatoes from plowed ground, a vine-engaging bar supported to extend outwardly from said plow frame above said mold-board and then downwardly toward said second frame, and a fin carried by the lower end of said bar and positioned to direct plowed ground delivered from said mold-board rearwardly to said means.

In testimony whereof I affix my signature in presence of two witnesses.

GEORGE W. JESSUP, Sr.

Witnesses:
A. V. GROUPE,
S. I. HARPER.